(12) United States Patent
Rodosek et al.

(10) Patent No.: US 7,302,482 B2
(45) Date of Patent: Nov. 27, 2007

(54) TRAFFIC FLOW OPTIMISATION SYSTEM

(75) Inventors: Robert Rodosek, Munich (DE); Emory Barry Richards, Kent (GB)

(73) Assignee: Cisco Technology, Inc., San Jose, CA (US)

( * ) Notice: Subject to any disclaimer, the term of this patent is extended or adjusted under 35 U.S.C. 154(b) by 746 days.

(21) Appl. No.: 10/415,476

(22) PCT Filed: Nov. 1, 2001

(86) PCT No.: PCT/GB01/04845

§ 371 (c)(1),
(2), (4) Date: Oct. 15, 2003

(87) PCT Pub. No.: WO02/37764

PCT Pub. Date: May 10, 2002

(65) Prior Publication Data

US 2004/0218529 A1    Nov. 4, 2004

(30) Foreign Application Priority Data

Nov. 1, 2000    (GB) ................................ 0026703.9

(51) Int. Cl.
*G06F 15/173*    (2006.01)
*G06F 15/16*    (2006.01)
*G06F 11/00*    (2006.01)
*H04J 1/16*    (2006.01)

(52) U.S. Cl. .................. 709/224; 709/233; 709/239; 370/252; 370/232; 370/238

(58) Field of Classification Search ............... None
See application file for complete search history.

(56) References Cited

U.S. PATENT DOCUMENTS

| | | | |
|---|---|---|---|
| 5,600,632 A | | 2/1997 | Schulman |
| 5,734,825 A | * | 3/1998 | Lauck et al. ................ 709/233 |
| 6,061,331 A | * | 5/2000 | Conway et al. ............. 370/232 |
| 6,574,669 B1 | * | 6/2003 | Weaver ...................... 709/239 |
| 6,728,670 B2 | * | 4/2004 | Schenkel et al. ........... 704/224 |
| 6,785,240 B1 | * | 8/2004 | Cao et al. ................... 370/238 |
| 6,873,600 B1 | * | 3/2005 | Duffield et al. ............ 370/252 |
| 2002/0097680 A1 | * | 7/2002 | Liu et al. .................... 370/238 |

FOREIGN PATENT DOCUMENTS

| | | |
|---|---|---|
| EP | 0576122 | 12/1993 |
| EP | 1 043 871 | 10/2000 |
| EP | 1130849 | 9/2001 |

\* cited by examiner

*Primary Examiner*—Wen-Tai Lin
(74) *Attorney, Agent, or Firm*—Cindy Kaplan

(57) ABSTRACT

A method of calculating data traffic flow in a communications network, the communications network comprising a plurality of nodes including a plurality of source nodes and a plurality of destination nodes, the nodes being connected to one another by links, the method comprising: (a) obtaining data traffic flow measurements through said nodes and links as input data; (b) correcting said input data if inconsistencies are detected; (c) calculating upper and lower bounds of data traffic flow from a selected one of the plurality of source nodes to a selected one of the plurality of destination nodes using the corrected input data.

30 Claims, 7 Drawing Sheets

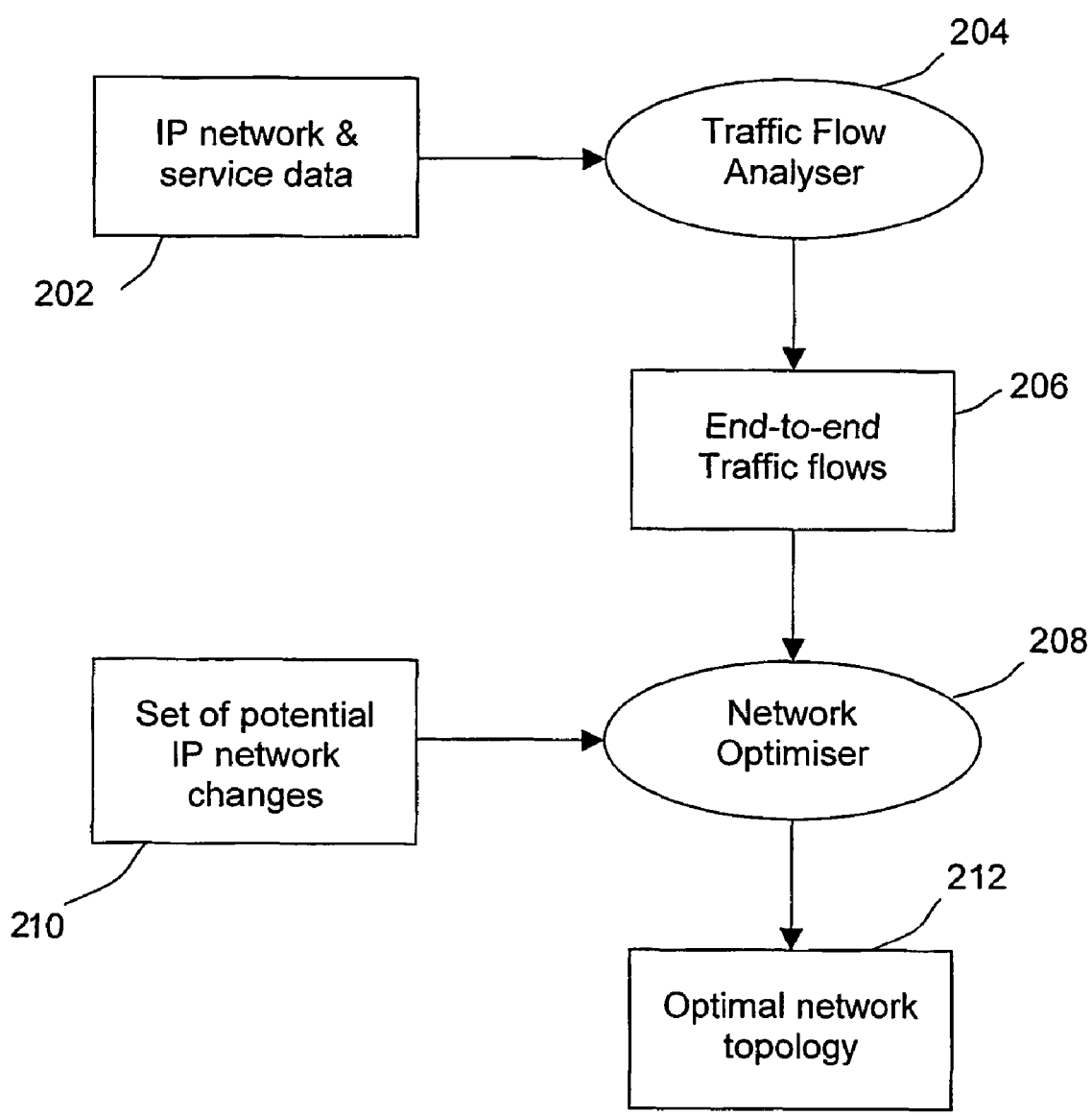

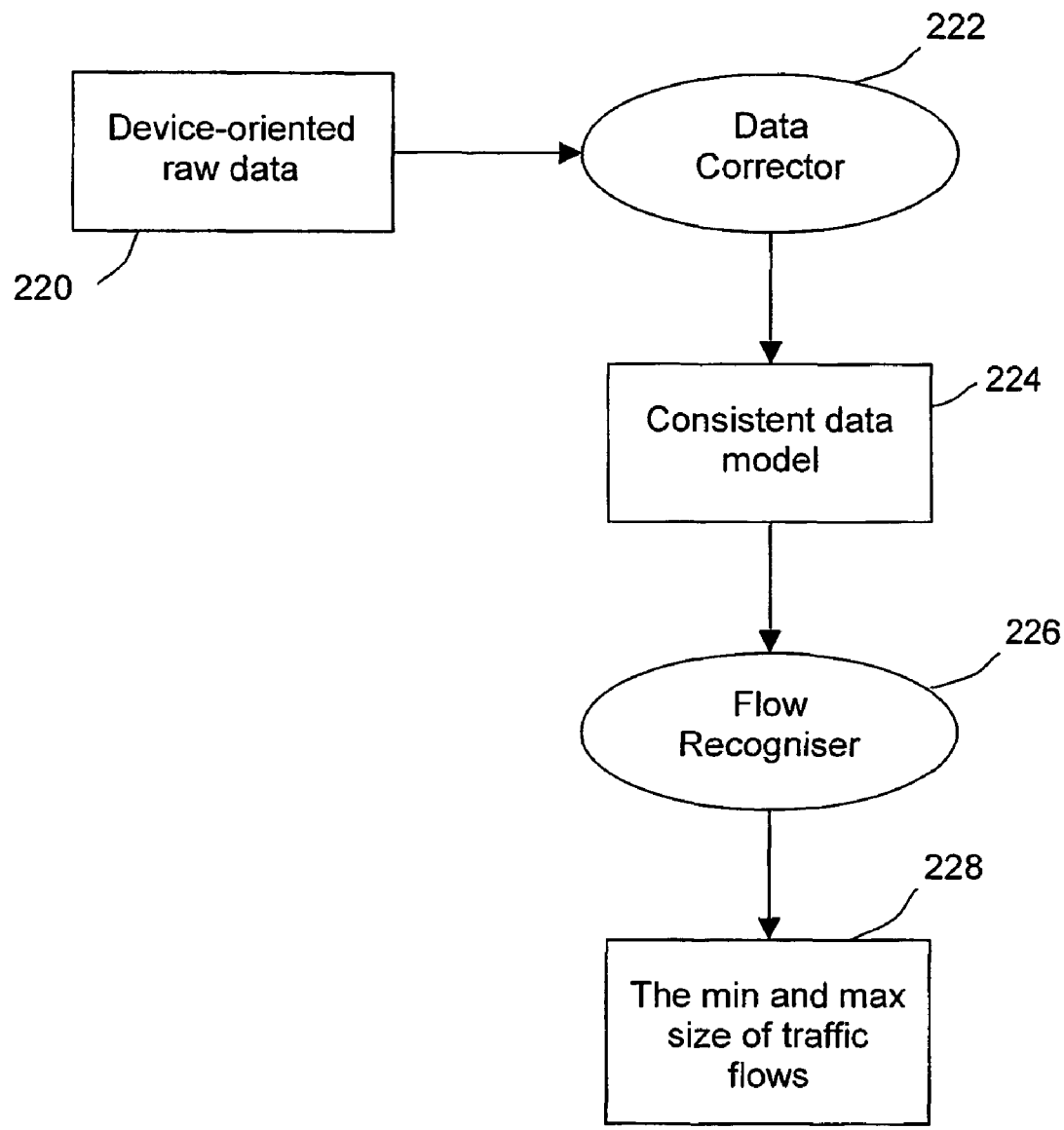

B->A  0-100% of 1000
B->C  0-100% of 1000

B->A  42-86% of 7000
B->C  14-58% of 7000

B->A  52-61% of 7000
B->C  39-48% of 7000

Fig. 6
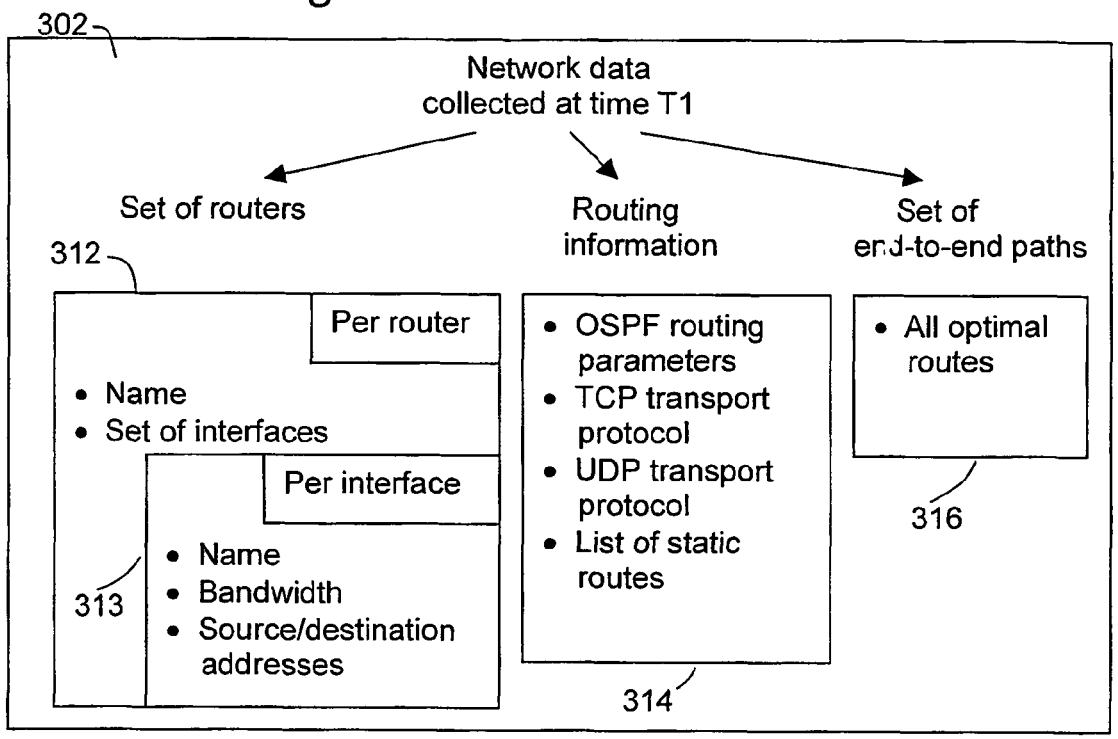
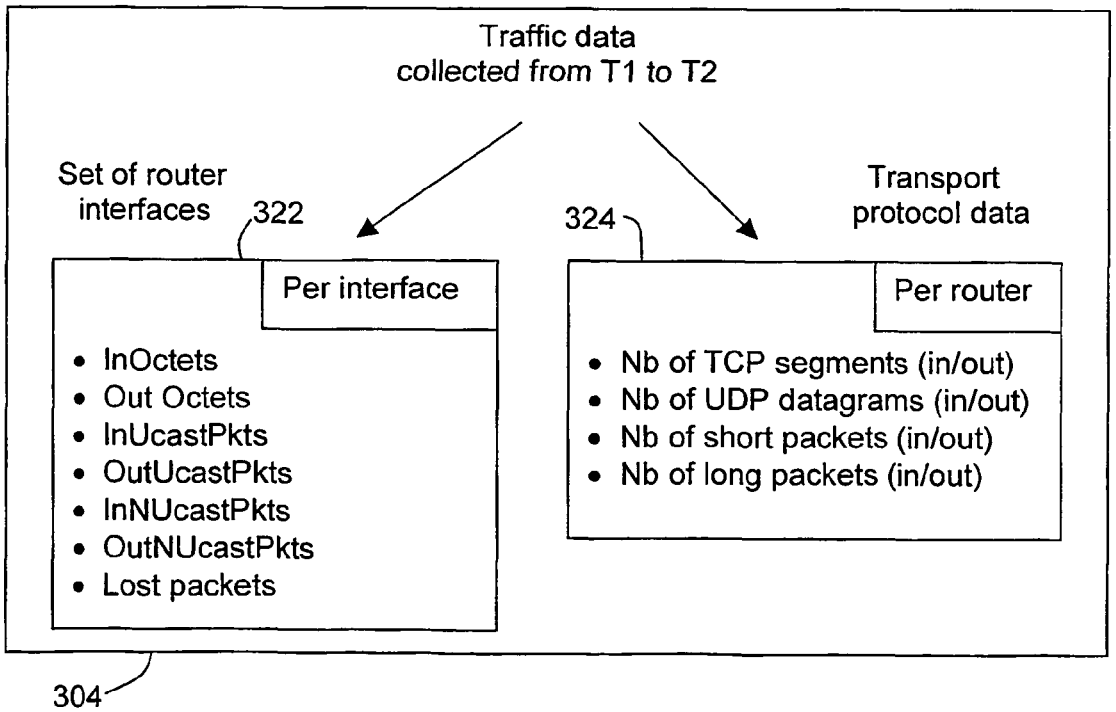

TRAFFIC FLOW OPTIMISATION SYSTEM

This invention relates to traffic flow optimisation systems. More particularly, but not exclusively, it relates to methods of calculating data traffic flows in a communications network.

BACKGROUND

In the 1980's network communication evolved from local networking on site (the Ethernet Local Area Network or LAN) to Inter-networking between sites. As the usage of Internet as a service network grew so did its commercial orientation. And by the late 1980s the commercial Internet Service Providers (ISPs) started to make their debut. Today, computers (for single users or part of a corporate environment) are serviced by more than 30,000 ISPs across the world, predominantly operating on a commercial basis as a service provider. The services range from the mass-marketing of simple access products to service-intensive operations that provide specialized service levels to more localized internet markets. We are mainly concerned with ISPs providing networks, referred to more generally as network service providers.

With networks playing an ever-increasing role in today's electronic economy, network service providers need to manage their networks more effectively. The five major functional areas of "network management" and the current tools and techniques that exist to handle them are: fault management, configuration management, security management, performance management, and accounting management.

With the rapid growth of network usage, network service providers are currently facing ever increasing expectations from their customers to the quality of service (minimum delay, maximum reliability, high bandwidth for data transfer rates, low costs, etc). The main task is to satisfy the quality of service parameters while minimizing the usage of network resources such as capacity of the network lines. But there are other issues relating to future sales, strategic planning and business development. One concerns Service Level Agreements (SLAs) with their customers.

An SLA is a service contract between a network service provider and a subscriber, guaranteeing a particular service's quality characteristics. SLAs usually focus on network availability and data-delivery reliability. Violations of an SLA by a service provider may result in a prorated service rate for the next billing period for the subscriber.

Thus it is important for a network service provider to know whether it can issue an Service Level Agreement (SLA) to another customer without violating any existing SLAs. Here it needs to estimate what is the largest new workload that the network can handle with respect to network availability and data-delivery reliability.

In strategic planning, the objective is to investigate how to revise the existing network topology (and connection points to external nodes) such that the resource utilization is minimized and more balanced. The problem is to minimize the resource utilization by determining which backbone lines are overloaded, and to add lines to the network to redistribute the load. For a given workload, the question is where to add the lines in the network and what is the required bandwidth of each backbone line such that the capacity of the new network topology is greater, i.e. can deal with a larger load. Another question concerns which node should be used to connect a new customer to the network. This should be the one which minimises resource utilisation and expands capacity in the most cost effective way.

Another key issue which needs to be addressed by the service provider is whether the current business of an ISP can be extended, in terms of number of customers and connections to other ISPs.

For business development, one key question is how to maximise the number of customers. This clearly depends on the existing workload and where it is distributed. Another related question is how other service providers should be connected to the backbone. This should be done so as to minimise resource utilisation.

Each of the issues discussed above represents an optimisation problem. Current network management packages provide essentially device-oriented information whereas the issues can only be resolved on the basis of service-oriented information. Device oriented information tells us about the state of a network and its data flows at a given time. This is the core information provided by network management protocols such as the Simple Network Management Protocol (SNMP), which is used in most network management systems. But this does not address the optimisation problems mentioned above.

U.S. Pat. No. 6,061,331 relates to a method of estimating source-destination traffic in a packet-switching network utilising a decomposition method. The method uses measurements made over multiple disjoint time periods of traffic coming into the network at each node and measurements of traffic on each link. The method subsequently uses these measurements to set up linear programming problems for finding an approximate source-destination traffic matrix that optimally fits the measured data.

SUMMARY OF THE INVENTION

It is an aim of the present invention to overcome the disadvantages mentioned above and to provide service-oriented information on which the business plan of network service providers can be based.

It is a further aim of the present invention to model services and calculate traffic flow between any two nodes of the network.

According to one aspect of the present invention, there is provided a method of calculating data traffic flow in a communications network, the communications network comprising a plurality of nodes including a plurality of source nodes and a plurality of destination nodes, the nodes being connected to one another by links, the method comprising obtaining data traffic flow measurements through said nodes and links as input data; correcting said input data if inconsistencies are detected; and calculating upper and lower bounds of data traffic flow from a selected one of the plurality of source nodes to a selected one of the plurality of destination nodes using the corrected input data.

In this way limits on the upper and lower value of the traffic flow between any pair of external nodes (i.e. any end-to-end path) can be calculated from input data giving information about the total traffic flows on links. The calculated ranges of traffic flow between any pair of external nodes may then be used in order to optimise the network, to analyse the resilience of the network or to get a forecast of the expected traffic in the future.

According to another aspect of the present invention, there is provided a method of calculating source-destination traffic in a data communications network, the network comprising a plurality of nodes including a plurality of source nodes and a plurality of destination nodes, the nodes being interconnected by links, and a plurality of routes each comprising one or more links and originating at a source node and terminating at a destination node, the method comprising: obtaining measurements of the rate of data traffic input into and output from nodes and links; determining the relations between the data traffic rates through said routes to describe the network behaviour; calculating for each of the links of a selected route what proportion of the data traffic rate originates at the destination node and terminates at the destination node of said selected route; and calculating a minimum and a maximum data traffic rate through said selected route.

In this way information about the network behaviour, such as the network protocol or the routing protocol can be used in addition to the traffic flow measurements in order to calculate limits of the traffic rate through selected routes.

According to another aspect of the present invention, there is provided a method of calculating data traffic in a communications network, the network comprising a plurality of nodes interconnected by links, and a plurality of routes each comprising a number of said links and interconnecting a source node with a destination node, the method comprising: (a) obtaining data traffic flow measurements as input data; (b) determining a plurality of constraints describing the topology and/or behaviour of the network; (c) testing the consistency of said input data; and (d) calculating an upper and a lower bound of data traffic along one or more of said routes using said input data and the constraints determined in step (b).

In this way upper and lower bounds of the data traffic along any route of the communications network can be calculated based on the traffic flow measurements as input data and the determined constraints.

Preferably, the constraints relate to any of the following: size of data packets used in the network; relationship between the number of data packets and the data traffic volume; constraints determined by the routing protocol used in the network; the relationship between incoming and outgoing data traffic at said plurality of nodes; the relationship between the data traffic at both ends of each link; the relationship between the data traffic along said routes and the data traffic input into and output from the network.

In this way the constraints may be based on different information, as for example routing-based, link-based, node-based or error-based information or any combination of the information listed above. Thus the resulting intervals of traffic flows on certain routes can be derived precisely enough to be used in a traffic flow optimisation system.

According to another aspect of the present invention, there is provided an apparatus for calculating data traffic flows in a communications network, the communications network comprising a plurality of nodes including a plurality of source nodes and a plurality of destination nodes, the nodes being connected to one another by links, the apparatus comprising: means for obtaining measurements of the data traffic flow through nodes and links; means for correcting said measurements and calculating upper and lower bounds of the data traffic flow originating at a selected one of the plurality of source nodes and terminating at a selected one of the plurality of destination nodes.

According to another aspect of the present invention, there is provided an apparatus for calculating source-destination traffic in a data communications network, the network comprising a plurality of nodes including a plurality of source nodes and a plurality of destination nodes, the nodes being interconnected by links, and a plurality of routes each comprising one or more links and originating at a source node and terminating at a destination node, the apparatus comprising means for obtaining measurements of the rate of data traffic input into and output from nodes and links; means for determining the relations between the data traffic rates through said routes to describe the network behaviour; and means for calculating for each of the links of a selected route what proportion of the data traffic rate originates at the source node and terminates at the destination node of said selected route, and a minimum and a maximum data traffic rate through said selected route.

According to another aspect of the present invention, there is provided a network management system for managing a network comprising a plurality of nodes including a plurality of source nodes and a plurality of destination nodes, the nodes being interconnected by links, and a plurality of routes each comprising one or more links and originating at a source node and terminating at a destination node, the network management system comprising means for measuring the data traffic input into and output from nodes and links over a predetermined period of time to determine the rate of data traffic; and an apparatus for calculating data traffic flow as described above.

Further aspects and advantages of the invention will be appreciated from the following description and accompanying drawings, wherein FIG. 1 illustrates a simplified example of an Internet Protocol (IP) network in which the present invention can be implemented;

FIG. 3 illustrates the relationship between a traffic flow analyser and network optimiser according to embodiments of the present invention;

FIG. 4 illustrates the relationship between different components of the traffic flow analyser according to embodiments of the present invention;

FIG. 6 illustrates the input data used to analyse the traffic flow according to one embodiment of the present invention.

Figure 1:
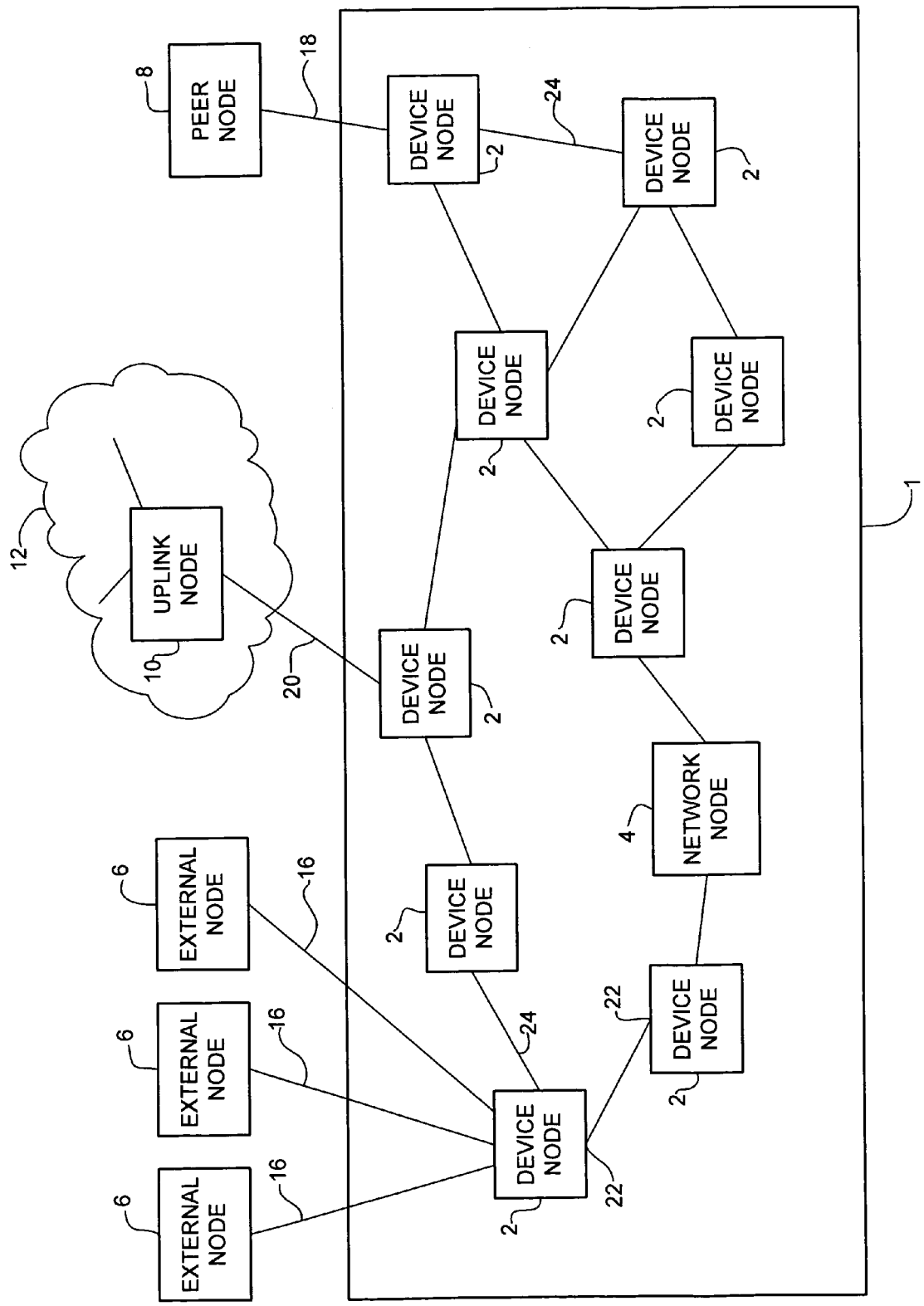

FIG. 1 illustrates a simplified example of an Internet Protocol (IP) network. Generally, such a network consists of nodes and lines. Nodes in an IP network may either be internal or external. An internal node represents a location in the network where traffic data is directed through the network. It can be of two types: a device node 2 denoting a network device such as for example a router or a network node 4 denoting a local network (e.g. Ethernet, FDDI ring). An external node 6 represents a connection to the IP network from other networks.

FIG. 1 illustrates for example external nodes 6 to customers, which connects the network to a customer's network, an exchange point 8 called a peer node and an uplink node 10 which connects the network to another provider's network 12.

A line is a directed arc between two nodes. Depending upon the nature of the two nodes, network lines take different denominations. There are two main types of lines, the backbone and access lines.

A backbone line 24 is a line between two internal nodes; at least one of them must be a device node. Indeed, every line in an IP network can connect either two device nodes or one device node and one network node. A connection to a device node is realized via a physical port of the device. If the device is a router, then the port is called router-interface 22. A connection to a network node is realised via a virtual port of the network.

An access line is a line between a device node and an external node. Access lines include peering lines 18, uplink lines 20 and customer lines 16. A peering line connects a device node to a peer node, the service is provided free of charge. An uplink line connects a device node to an uplink node, and a cost is usually associated with such a line. A customer line connects a device node to a customer node.

The line traffic is the volume of data transported through a line and is measured in mbps (mega bits per seconds). The bandwidth of a directed line defines the maximum capacity of traffic that can be transported through this line at any one time.

In this embodiment, we refer to IP-based networks. In an IP network the device nodes are represented by routers; we assume that any two nodes are directly connected by at most one line, and every external node is directly connected to one internal device node.

A network with only internal nodes and backbone lines, such as network 1 illustrated in FIG. 1, is called a backbone.

A path from a source to a destination node is a sequence of linked nodes between the source and destination nodes. A route is a path between end-to-end internal nodes of a network that follows a given routing protocol.

A group of nodes corresponds to a set of external nodes that have some common characteristics. The criteria might for example be that the external nodes are directly connected to internal device nodes of the same geographical area, that the external nodes represent the same customer or that external nodes represent the same tariff class of SLAs. The concept of groups is useful to recognise flows between geographical areas, evaluate customer charges, and revise tariff classes.

A traffic load is the load of data traffic that goes through the network between two external nodes independently of the path taken over a given time interval. A traffic load between two groups of external nodes represents all traffic loads between nodes of these groups. For example the traffic load between groups {A,B} and {C,D} is equal to the sum of the traffic loads between A and C, A and D, B and C, and B and D.

As the amount of data information available is generally not sufficient to derive an exact traffic load as will be explained in more detail in the following, the upper and lower bounds of the average data traffic flow will be calculated.

A traffic flow between external nodes is the traffic load on one specific route between these nodes over a time interval.

A router is an interconnection between network interfaces. It is responsible for the packet forwarding between these interfaces. It also performs some local network management tasks and participates in the operations of the routing protocol (it acts at layer 3, also called the network protocol layer). The packet forwarding can be defined according to a routing algorithm or from a set of static routes pre-defined in the routing table.

A routing algorithm generates available routes for transporting data traffic between any two nodes of a given network.

In the following, embodiments of the present invention will be described which are based on the OSPF (Open Shortest Path First) routing algorithm for IP-based networks. This algorithm determines optimal routes between two network nodes based on the "shortest path" algorithm. The metrics to derive the shortest path are based on the maximum capacity of each line of this path, and hence the routing cost is computed by a static procedure. The lowest routing cost determines the optimal route. If there is more than one optimal path, then all optimal paths are solutions (best routes) and the traffic load between the two end-nodes is divided equally among all the best routes.

The network resources of a network provider are nodes and lines with associated bandwidths. A resource cost associates prices with each line and node. Pricing network resources depends on many factors such as the location of the lines. One possibility is to evaluate the cost of volume of traffic through a line by (volume of traffic)/(bandwidth of the line)*(cost of the line). The network cost is the sum of costs of all network resources.

Figure 2:
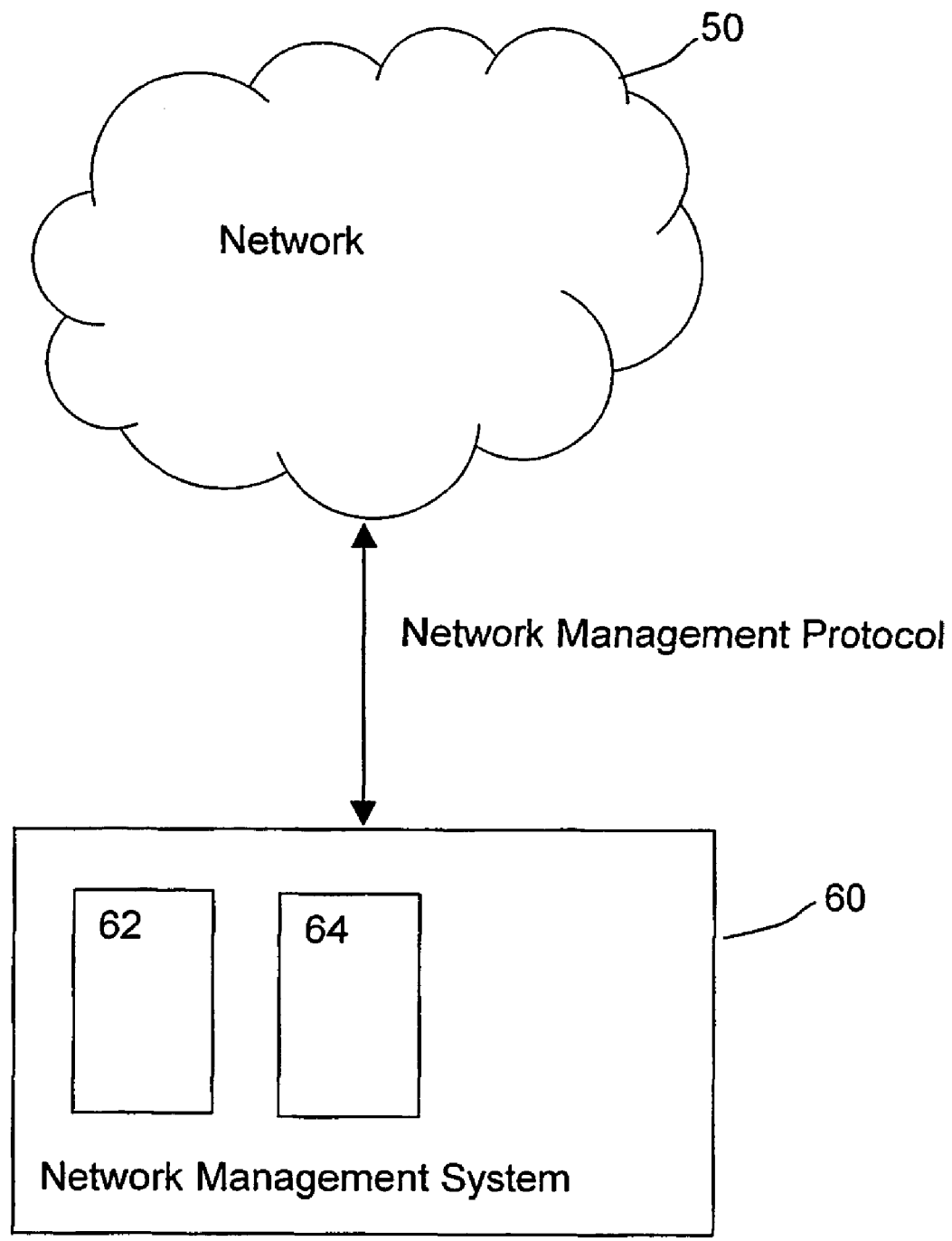
FIG. 2 illustrates the relationship of a network and a network management system in which the present invention may be implemented.

FIG. 2 illustrates the relationship of the network and a network management system 60 in which the present invention may be implemented. Network management system 60 performs the network management functions for network 50. The network management system communicates with the network using a network management protocol, such as the Simple Network Management Protocol (SNMP). The network management system 60 includes a processor 62 and a memory 64 and may comprise a commercially available server computer. A computer program performing the calculation of data traffic flow is stored is memory 64 and can be executed by processor 62.

The traffic flow optimisation system according to the present invention comprises a traffic flow analyser. The traffic flow analyser is a program, which operates on the network management system. The traffic flow analyser derives service-oriented information that captures how the current IP services are mapped to network resources. In particular it performs a backbone analysis of flows between any two network connection points or external nodes over a given time interval. Based on the derived flows and the external point chosen (customers, other ISPs, etc), different types of network service analysis can be performed.

The traffic flow optimisation system may further comprise a network optimiser, a resilience analyser and/or a forecaster. These elements may either be implemented in the network management system or in a connected computer system.

A network optimiser identifies potential network bottlenecks using the traffic flow results, suggests a set of best possible changes to the network topology and reports on the analysis of the effects of such changes to the network and services.

The resilience analyser identifies which of the existing traffic flows on a network can (and cannot) be accommodated in the event that certain links (set of links) fail.

The forecaster identifies the impact on the network of rising traffic flows.

FIG. 3 illustrates the relationship between a traffic flow analyser 204 and network optimiser 208. IP network and service data are used as input (202) into the traffic flow analyser as will be described in more detail below. The traffic flow analyser then calculates the ene-to-end traffic flows (206) which are subsequently used in the network optimiser 208 together with information about potential IP network changes (210). The network optimiser 208 then determines an optimal network topology (212).

A similar relationship holds between traffic flow analyser and the other two modules, viz. resilience analyser and forecaster.

The traffic flow analyser calculates the upper and lower bounds of the data traffic flow between any two external nodes. In order to achieve this, the analyser uses information about the network topology (network data) and measurements of the traffic flow (traffic data). The general concept of the traffic flow analyser will now be explained with help of a simplified model.

Figure 5A:
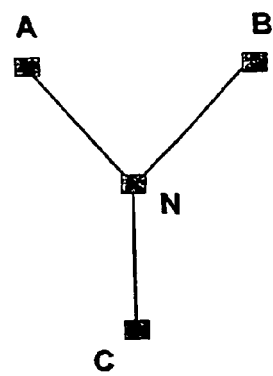
FIGS. 5A to 5D illustrate in a simplified way the method used to analyse the traffic flow according to the present invention.

FIG. 5A illustrates a network with one internal node N that is connected to three internal nodes A, B, and C, each of which is directly connected to external nodes. The routes between any pair of the three internal nodes A, B and C are: (A, N, B), (A, N, C), (B, N, A), (B, N, C), (C, N, A), (C, N, B).

Figure 5B:
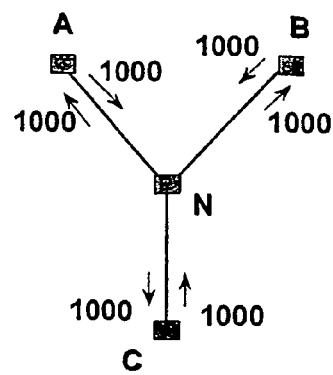

In FIG. 5B the volume of traffic flows on any link is specified to be 1000 bytes. Let $V_{XY}$ denote the volume of traffic that goes from node X to node Y. For every directed line we have the following constraint: the volume of traffic on a line is equal to the total volume of traffic of all routes going through this line. For example, if the total traffic on the directed line A to N is 1000 bytes, then the following equation can be set up: $1000=V_{AC}+V_{AB}$.

The next step is now to calculate the minimal and maximal volume of traffic data on each route of the network. In this example the traffic is balanced, i.e. the minimum and maximum sizes of each flow are 0 and 1000 bytes respectively. For example, the flow from B to A would be 0 bytes if all the traffic from B to N (1000 bytes) were going to C. On the other hand, all 1000 bytes could be destined for A, in which case the flow from B to A would be 1000 bytes. No useful bounds on traffic flows can be derived from such a scenario.

Figure 5C:
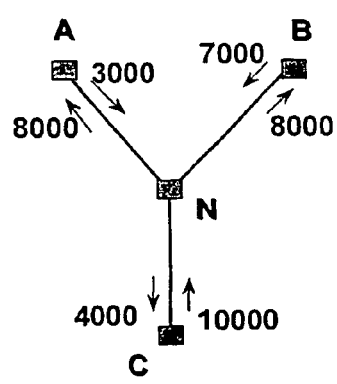

Referring now to FIG. 5C, it can be seen that in an unbalanced situation meaningful bounds can be inferred. For example 7000 bytes are transmitted between B and N, whereas only 4000 bytes are transmitted from N to C.

Thus at most 4000 out of 7000 bytes (or 58% of the traffic) can go from B to C. Furthermore if 4000 of the 7000 bytes transmitted from B to N travel to C, then 3000 bytes (or 42%) must go from B to A. Similarly, 3000 bytes are transmitted from A to N, whereas 4000 bytes travel from N to C. Thus, at least 1000 bytes out of 7000 bytes (or 14%) must go from B to C. In the event 6000 bytes (or 86%) goes from B to A.

In practice, traffic in real networks is typically unbalanced. In this way upper and lower bounds on the traffic flow on any particular route can be derived using measurements of traffic flow through individual links and knowledge of the network topology. However, the derived bounds are usually not tight enough to be useful.

Figure 5D:
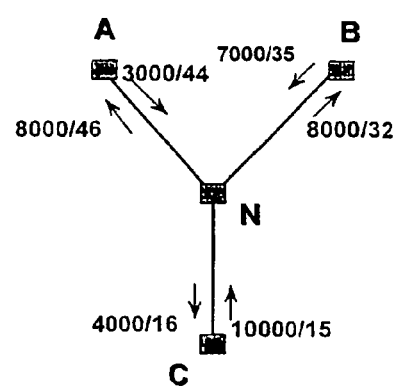

Referring now to FIG. 5D, we show how additional traffic data like packet information can be used to establish tighter bounds. Suppose that we know the number of packets flowing between each pair of nodes. The packets sizes range from 64 to 576 bytes and we know that more than 50% of packets transported through node N are packets of length 64 and 576 bytes. For example, suppose the number of packets flowing from B to N is 35. Since the size of the flow from B to N is 7000 bytes, at most 9 packets of length 576 bytes could be going from B to N. Thus, at most 25 packets of the length 64 bytes could be going from B to N. Considering the packets of the length 64 and 576 bytes on all lines connected to N, it follows that at least 52% and at most 61% of the traffic transmitted from B to N could be going to A. Similarly, the upper and lower bounds on the traffic flow from B to C can be determined to be 48% and 39%, respectively.

In this data model the corresponding constraints on conservation of traffic over the number of packets are added to the model. The computed end-to-end flows have more refined bounds than with the first data model (see FIG. 5C). The traffic flow analyser as described in the following is based on such a data model.

The traffic flow analyser calculates the minimal and maximal volume of traffic flow between any two external nodes in an IP-based network over a given time interval. Input data for these calculations are network data and traffic data.

Network data contains information about the network topology, as for example information about the routers, the router interfaces, the bandwidth of each link or the parameters of the routing protocol used. Such a routing protocol may for example be the OSPF (Open Shortest Path First) protocol. Alternatively, other routing protocols like ISIS (Intermediate System to Intermediate System) and EIGRP (Enhanced Interior Gateway Routing Protocol) may be used. In addition, information about the transport layer may be used, such as the TCP transport protocol or the UDP transport protocol. The list of static routers may also be included. Network data may also include information about the end-to-end paths as for example all optimal routes.

Suitable network elements have to be selected from which information is provided and in which measurements of traffic data are made.

In the embodiment described below traffic data are collected from routers and router interfaces. Suitable data collected at each router interface are for example the number of bytes (or octets) transmitted to and from the interface (InOctets and OutOctets) or the total number of unicast packets received by or transmitted from the interface (InUnicastPkts or OutUnicastPkts). Traffic collected from transport protocol data include for example the number of short and long packets, which are received by and sent from a router. A more complete list of data suitable for the traffic measurements is given below.

Traffic data are collected for a certain time interval and are collected on a regular basis. According to one embodiment, traffic data are collected every 5 minutes and the user may choose the interval over which data is collected. A time interval of, for example, 20 to 25 minutes is suitable. Measurements relating to the average volume of traffic data passing through every line are taken and stored. The average volume of traffic data is the total traffic flow divided by the time interval. For example if a total of 150 octets (or bytes) have been counted between T1 and T2, the average data is 150/(T2−T1). This approach does not show high peaks in the traffic flow. But it is sufficient to determine the load being carried through a network.

According to the embodiments described herein, traffic data is collected from network management protocol tables stored in the network management system. The network management protocol such as the SNMP determines the incoming and outgoing traffic at a given time at each router and each router interface.

The following two tables summarise the information that SNMP collects and stores at each router and each router interface and which may be used as input data for calculated intervals of traffic flow. In the following, "In" denotes traffic directed towards the router and "Out" denotes traffic directed from the router. Data associated to interfaces indicates the local traffic on a directed line, whereas data associated to a router indicates the total traffic coming from all lines directed to the router and leaving from the router. For each router interface,

| | |
|---|---|
| InOctets | Total number of octets received (from interface to router) |
| InUcastPkts | Total number of unicast packets received |
| InNUcastPkts | Total number of non-unicast (i.e. subnetwork-broadcast or subnetwork-multicast) packets received |
| InDiscards | Total number of inbound packets discarded due to local resource limits |
| InErrors | Total number of inbound packets discarded due to error |
| OutOctets | Total number of octets sent from router to interface |
| OutUcastPkts | Total number of unicast packets sent |
| OutNUcastPkts | Total number of non-unicast packets sent |
| OutDiscards | Total number of outbound packets discarded due to local resource limits |
| OutErrors | Total number of outbound packets discarded due to error |

For each router,

| | |
|---|---|
| InTCPSegs | Total number of segments received |
| OutTCPSegs | Total number of segments sent |
| InUDPDatagrams | Total number of UDP datagrams received |
| OutUDPDatagrams | Total number of UDP datagrams sent |
| UndersizePkts | Total number of packets received that were less than 64 octets long |
| Pkts64Octets | Total number of packets received that were 64 octets |
| Pkts576Octets | Total number of packets received that were 576 octets |
| OversizePkts | Total number of packets received that were longer than 576 octets |

One important point for the embodiments described herein is that even though traffic data determines the volume of data being transported through a line, it is accessed via the router interfaces. As a reminder, an IP network line connects either two routers (e.g. R1 and R2) or one router and a network node (e.g. R1 and N1). So the traffic data of a line connecting to routers (R1, R2) is read from the output interface of R1 and from the input interface of R2. The traffic data of a line connecting a router and a network node (R1, N1), on the other hand, is only read from the output interface of R1.

Also, traffic data can be collected with respect to different OSI layers (such as IP and TCP). At the network or IP layer (third layer), the data is in the form of unicast packets (one-to-one messages between two host systems) and non-unicast packets (one-to-many). These include broadcast and multicast messages. Most of the packets are unicast. Lost packets are also recorded at this layer. At the transport layer (fourth layer), the data is in the form of TCP segments and UDP datagrams which decompose into packets at the third layer. TCP and UDP are protocols which work at layers above the IP and which offer end-to-end functionality between a pair of host systems in different ways. One main characteristic of the TCP protocol is that for each packet sent it requires an acknowledgement of receipt.

As indicated above, the traffic flow analyser according to the embodiments described herein uses information about the IP networks topology (i.e. network data) and measurements of the traffic flow (i.e. traffic data) on each line, such as number of unicast and non-unicast packets at each router interface, in order to calculate upper and lower bounds of data traffic flow of any route between two external nodes.

FIG. 6 gives an example of a set of network data (302) and traffic data (304) which can be used in an flow analyser according to one embodiment of the present invention.

The network data (302) are collected at a time T1. Information about the set of routers (312), the routing information (314) and the set of end-to-end paths (316) may for example be used. Information about the set of routers (312) also include information about the set of interfaces (313). Routing information may include OSPF routing, the TCP transport protocol, the UDP transport protocol and the list of static routes. The set of end-to-end paths (316) may for example include all optimal routes.

The traffic data (304) are collected during a time interval [T1,T2]. Certain information like the number of octets, the number of unicast packets or non-unicast packets and the number of lost packets are collected at the router interfaces (322). Other information like the number of TCP segments, the number of UDP datagrams and the number of short and long packets are collected per router (324).

The network data and the traffic data are then used to derive constraints. The data traffic flow intervals for any particular route may then be calculated from the input data (i.e. the measurements of the traffic data) such that the established constraints are fulfilled. Linear programming is used to derive the limits and the traffic flow.

The traffic flow analyser includes two main components: the data corrector and the flow recogniser. FIG. 4 illustrates the relationship between the components of the traffic flow analyser. The data corrector 222 uses device-oriented raw data 220 to identify inconsistencies in the input data and to correct the data. The data corrector 222 provides then a consistent data model 224, which can subsequently be used in flow recogniser 226. The flow recogniser uses the corrected data to calculate the average data flow intervals 228.

The input data may be inconsistent with respect to the network protocols that define the network behaviour. A reason for inconsistencies might for example be that some network data is lost (e.g. the collected data from a router is not transported through the network). Other reasons might be that the network configuration is wrong (e.g. the counter for the size of traffic on a given interface does not represent the size of that traffic) or that the network data from different router interfaces (in case of a router-router directed line) is not collected at the same time and results in slight differences of size.

There are two main types of data errors, and these should be corrected separately: gross errors and small errors. Gross errors correspond to violations of local constraints like conservation of line traffic sizes. The cause of gross errors often comes from the same data information being read by two different sources that provide different values (e.g. router interfaces on both sides of a line). Small errors tend to involve more global constraints over the conservation of flows and should require small changes only. The cause of small errors often comes from different time windows being used to collect traffic data at the routers.

The error correction problem is handled in two consecutive steps. We first correct gross errors, and then small errors. Both data error correctors consider the same set of input data but aim at detecting different levels of data inconsistencies and so are based on different constraints. Since the data correction methods differ as well, we consider different decision criteria. It is important to distinguish between both since trying to correct both in one single step would lead to tackling the wrong problem based on erroneous assumptions.

We decompose the Error Corrector module into two sub-problems:
i) Gross error corrector: detects and corrects gross errors.
ii) Small error corrector: small errors are tackled using the assumptions made from the gross error corrector.

In the embodiments described, the following network elements are used to collect network data: the Set of routers ($N=\{1, \ldots, i, \ldots, n\}$), the set of interfaces to each router i ($J_i=\{1, \ldots, j\}$) and the set of end-to-end paths ($P=\{1, \ldots, p\}$).

The input data used are for example the number of octets transported to and from the router interface and the number of unicast TCP packets transmitted to and from the router interface. We also use the number of TCP packets of a certain length in order to get further constraints on the data transmitted in the network. The numbers used are the number of short unicast TCP packets (64 octets), the long unicast TCP packets (576 octets) and other unicast TCP packet sizes.

The gross error corrector uses two types of constraints. The first are general constraints, which describe the network behaviour and flow constraints. This type of constraints is used throughout the traffic flow analyser. A second type of constraints is defined by specific rules to identify gross errors, which are solely used for the gross error detection and correction.

If no gross error is detected, the input values are not corrected and the data corrector continues with small error correction. If a gross error is detected, then the gross error is minimised using the constraints and a minimisation procedure. The data corrector uses then the corrected values instead of the input data value to proceed with the small error correction.

The minimisation procedure is achieved by defining an objective function for the gross error correction and minimising the derivation over the gross error variable.

After the gross errors have been corrected, the small errors are considered. A further set of constraints is used for detecting smaller inconsistencies in the data. Note that the data used for the small error correction have already been corrected in the gross error correction procedure described above. Furthermore, the small errors are directly linked to the gross errors, as we define a criterion, which is used to distinguish gross and small errors.

If inconsistencies are detected in the small error correction procedure, then the small error constraints and a further minimisation process are used to correct the small errors. Here we assume that after the gross error correction only small random errors are left, which are normally distributed around a mean of zero. Furthermore, we assume that these errors are independent from each other and have a diagonal covariance matrix. However, it is difficult to obtain the covariance for the network data. Thus we minimise the weighted quadratic random errors.

After the input data have been corrected in the gross and small error detection procedure, the amount of traffic can now be calculated between any two external nodes. This is done using the same principles as explained above with reference to FIGS. 5A to D. Because the exact amount of traffic cannot be determined, with the method described we calculate upper and lower bounds of data traffic flow between any two external nodes. All network behaviour and flow constraints mentioned above are used for this purpose.

The calculation process consists of two steps for each route. In a first step the traffic flow is minimised on the route considered, and in a second step the traffic flow is maximised on the same route.

Figure 7:
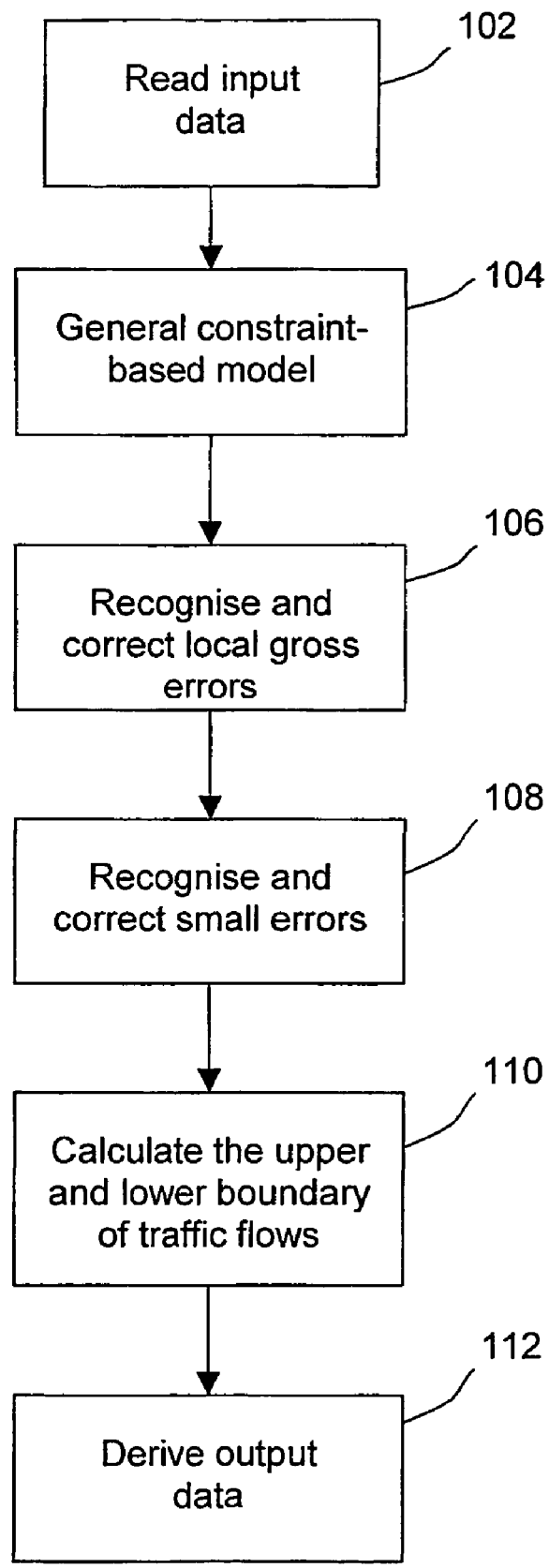
FIG. 7 is a flow chart diagram illustrating the individual steps in a traffic flow analyser according to embodiments of the present invention.

Before the individual steps in a traffic flow analyser will be set out in more detail, reference is made to the flow chart diagram of FIG. 7, which summarises the steps of a traffic flow analyser according to an embodiment of the present invention. In a first step the traffic flow analyser reads and normalises the input data (step 102).

In step 104 the relationships between the input data are determined and the constraints are generated. Routing-based, line-based, node-based constraints and group-to-group flow variables may for example be generated. The routing-based constraints may for example be achieved by firstly computing all hops according to the OSPF routing protocol, then generating the node-to-node flow variables and subsequently extracting the flow variables related to each directed line.

The error corrector recognises and corrects the local gross errors in step 106. The individual sub-steps are generating the gross and small error variables, generating the error-based constraints, deriving the gross error objective function and running a barrier algorithm. Subsequently the gross error variables are instantiated.

The error corrector recognises and corrects the small errors in step 108. The corrector derives the small error objective function and runs a barrier algorithm using the error-based constraints generated in step 106. Subsequently the small error variables are instantiated.

In step 110 the upper and lower boundaries of each group-to-group traffic flow are computed. To achieve this the traffic flow recogniser derives the minimum and maximum objective functions and subsequently runs a minimising and a maximising procedure (such as for example the simplex algorithm) to calculate the minimal and maximal traffic flow volume.

From the minimal and maximal traffic flow between any two groups the flows through each directed line may be derived in step 112. Subsequently, a cost function may be computed which can be used in the traffic flow optimisation system.

In the following first a conceptual model of a traffic flow analyser is described in more detail to illustrate the principles. Afterwards two more complete embodiments of a traffic flow analyser including complete constraint models are given. The first one uses the number of octets and the number of unicast TCP packets transported from the interface to the router and reciprocally. The second embodiment further includes the number of non-unicast packets and the number of UDP packets. Accordingly, more constraints can be used to calculate the traffic flow ranges.

Conceptual Model of a Traffic Flow Analyser

Input

The following variables are used as input values for each interface j of router i:

InOctets, OutOctets: number of octets transported from interface to router and reciprocally and InUcastPkts, OutUcastPkts: number of unicast TCP packets transported from interface to router and reciprocally Output of Gross Error Corrector The output of the data corrector are then error measures, first in the traffic size and second in the number of unicast TCP packets.

InOctetGrossErrorVar, OutOctetGrossErrorVar: gross error measured in the traffic size and InUnicastGrossErrorVar, OutUnicastGrossErrorVar: gross error measured in number of unicast TCP packets.

Network Behaviour Constraints

The following constraints describe the network behaviour:

Router Interface Constraints

C1. A set of linear constraints between the short-medium-long packets and the total number of incoming packets (Corrected_InUnicastVar).

Variable InShortPktVar represents the number of "short" packets (equal to 64 Octets), variable InLongPktVar represents the number of "long" packets (equal to 576 Octets), and variable InMidPktVar represents the number of "medium" packets (any other packets, i.e. either smaller than 64, or between 65 and 575, or greater than 576 Octets).

$$\text{Corrected\_InUnicastVar} = \text{InShortPktVar} + \text{InLongPktVar} + \text{InMidPktVar} \quad \text{C1.a}$$

C2. A set of linear constraints between the volume of traffic and the number of packets. These constraints result from the packet size that is between 32 and 1518 octets.

MinPktSize=32
MaxPktSize=1518

$$\text{Corrected\_InOctetVar} \leq 64*\text{InShortPktVar} + 576*\text{InLongPktVar} + \text{MaxPktsSize}*\text{InMidPktVar} \quad \text{C2.a}$$

$$\text{Corrected\_InOctetVar} \geq 64*\text{InShortPktVar} + 576*\text{InLongPktVar} + \text{MinPktsSize}*\text{InMidPktVar} \quad \text{C2.b}$$

C3. Same as the C1 constraints for the outgoing packets (Corrected_OutUnicastVar).

C4. Same as the C2 constraints for the outgoing packets and traffic.

C5. Conservation of traffic In/Out from the router on a given interface is due to the fact that we only deal with the TCP protocol at the transport level, and consider only one optimal route between two external nodes. Thus the traffic going in one direction comes back on the same path (single optimal route) and the number of packets in both directions is equal, since for each packet sent an acknowledgement is received.

Note that the following constraints apply only to unicast TCP traffic; they do not extend to non-unicast+UDP traffic.

$$\text{Corrected\_InUnicastVar} = \text{Corrected\_OutUnicastVar} \quad \text{C5.a}$$

$$\text{InLongPktVar} \leq \text{OutShortPktVar} \quad \text{C5.b}$$

$$\text{OutLongPktVar} \leq \text{InShortPktVar} \quad \text{C5.c}$$

Router Constraints

C6. For each router i, the total traffic (volume and number of packets) coming in is equal to the total traffic going out. This is calculated by summing the traffic over each interface j attached to i.

$$\Sigma\_j \; \text{Corrected\_InOctetVar}_j = \Sigma\_j \; \text{Corrected\_OutOctetVar}_j \quad \text{C6.a}$$

$$\Sigma\_j \; \text{Corrected\_InUnicastVar}_j = \Sigma\_j \; \text{Corrected\_OutUnicastVar}_j \quad \text{C6.b}$$

$$\Sigma\_j \; \text{InShortPktVar}_j = \Sigma\_j \; \text{OutShortPktVar}_j \quad \text{C6.c}$$

$$\Sigma\_j \; \text{InLongPktVar}_j = \Sigma\_j \; \text{OutLongPktVar}_j \quad \text{C6.d}$$

$$\Sigma\_j \; \text{InMidPktVar}_j = \Sigma\_j \; \text{OutMidPktVar}_j \quad \text{C6.e}$$

C7. The following two constraints result from data analysis. They describe relations between packages, and are a form of relaxation of packet ratios constraints.

$$2*\Sigma\_j \; \text{InMidPktVar}_j \leq \Sigma\_j \; \text{InShortPktVar}_j \quad \text{C7.a}$$

$$2*\Sigma\_j \; \text{InMidPktVar}_j \leq \Sigma\_j \; \text{InLongPktVar}_j \quad \text{C7.b}$$

Link Constraints

C8. For each link (i.e. two directed lines) between the interface j of router i and the interface l of router k, the traffic data (volume and number of packets) on the interface j from the router i is equal to the traffic data on the interface l directed to the router k. The reverse constraints hold as well.

$$\text{Corrected\_OutOctetVar}_{ij} = \text{Corrected\_InOctetVar}_{kl} \quad \text{C8.a}$$

$$\text{Corrected\_OutUnicastVar}_{ij} = \text{Corrected\_InUnicastVar}_{kl} \quad \text{C8.b}$$

$$\text{OutShortPktVar}_{ij} = \text{InShortPktVar}_{kl} \quad \text{C8.c}$$

$$\text{OutLongPktVar}_{ij} = \text{InLongPktVar}_{kl} \quad \text{C8.d}$$

$$\text{OutMidPktVar}_{ij} = \text{InMidPktVar}_{kl} \quad \text{C8.e}$$

We have the same constraints for incoming to ij and outgoing from kl.

Path Constraints

C9. The sum of traffic data (volume and number of packets) of all the paths $p_{kl} \in P_{ij}$ from external interface k to external interface l going through a directed line (i.e. on the interface j directed from the router i) is equal to the traffic on this line.

$$\text{Corrected\_OutOctetVar}_{ij} = \Sigma\_(p_{kl} \text{ in } P_{ij}) \; \text{OctetVar}_{kl} \quad \text{C9.a}$$

T1. Interface data checking. The following constraints require the traffic size (number of octets) to be related to the number of packets in some proportion for each interface j directed from the router i.

$$\text{MinPktSize}*\text{InUcastPkts} \leq \text{InOctets} \quad \text{T1.a}$$

$$\text{InOctets} \leq \text{MaxPktSize}*\text{InUcastPkts} \quad \text{T1.b}$$

$$\text{MinPktSize}*\text{OutUcastPkts} \leq \text{OutOctets} \quad \text{T1.c}$$

$$\text{OutOctets} \leq \text{MaxPktSize}*\text{OutUcastPkts} \quad \text{T1.d}$$

T2. Link data checking. For each link (i.e. two directed lines) between the interface j of router i and the interface l of router k, the traffic data (volume and number of packets) on the interface j from the router i should be "close enough" to the traffic data on the interface l directed to the router k, with a certain tolerance level. The reverse constraints should hold as well. If the checking holds then we consider that there is no gross error for this data otherwise there is. In the embodiments described we choose a tolerance level of TOL=0.1.

$$(1-TOL)*\text{InOctets}_{kl} \leq \text{OutOctets}_{ij} \leq (1+TOL)*\text{InOctets}_{kl} \quad \text{T2.a}$$

$$(1-TOL)*\text{InUcastPkts}_{kl} \leq \text{OutUcastPkts}_{ij} \leq (1+TOL)*\text{InUcastPkts}_{kl} \quad \text{T2.b}$$

$$(1-TOL)*\text{OutOctets}_{kl} \leq \text{InOctets}_{ij} \leq (1+TOL)*\text{OutOctets}_{kl} \quad \text{T2.c}$$

$$(1-TOL)*\text{OutUcastPkts}_{kl} \leq \text{InOctets}_{ij} \leq (1+TOL)*\text{OutUcastPkts}_{kl} \quad \text{T2.d}$$

T3. For each router i, the total traffic (volume and number of packets) coming in is equal to the total traffic going out with a certain tolerance level. This is calculated by summing the traffic over each interface j attached to i. If the checking holds then we consider that there is no gross error for this data otherwise there is.

$$(1-TOL)*\Sigma\_j \text{OutOctets}_{ij} \leq \Sigma\_j\ \text{InOctets}_{ij} \leq (1+TOL)*\Sigma\_j\ \text{OutOctets}_{ij} \quad \text{T3.a}$$

$$(1-TOL)*\Sigma\_j \text{OutUcastPkts}_{ij} \leq \Sigma\_j\ \text{InUcastPkts}_{ij} \leq (1+TOL)*\Sigma\_j\ \text{OutUcastPkt}_{ij} \quad \text{T3.b}$$

Relating Data and Corrected Variables

C10. For each interface j directed to a router i, the corrected traffic is equal to the raw traffic data plus the gross error factor.

InOctetSmallErrorVar$\epsilon$[-5% InOctets, +5% InOctets]
OutOctetSmallErrorVar$\epsilon$[-5% OutOctets, +5% OutOctets]
InUnicastSmallErrorVar$\epsilon$[-5% InUcastPkts, +5% InUcastPkts]
OutUnicastSmallErrorVar$\epsilon$[-5% OutUcastPkts, +5% OutUcastPkts]

$$\text{Corrected\_InOctetVar} = \text{InOctets} + \text{InOctetSmallErrorVar} + \text{InOctetGrossErrorVar} \quad \text{C10.a}$$

$$\text{Corrected\_OutOctetVar} = \text{OutOctets} + \text{OutOctetSmallErrorVar} + \text{OutOctetGrossErrorVar} \quad \text{C10.b}$$

$$\text{Corrected\_InUnicastVar} = \text{InUcastPkts} + \text{InUnicastSmallErrorVar} + \text{InUnicastGrossErrorVar} \quad \text{C10.c}$$

$$\text{Corrected\_OutUnicastVar} = \text{OutUcastPkts} + \text{OutUnicastSmallErrorVar} + \text{OutUnicastGrossErrorVar} \quad \text{C10.d}$$

Decision Criteria for Gross Error Correction

The objective function for gross error correction minimizes the deviation over the gross error variables.

$$\min \Sigma\_i\ \Sigma\_j \text{InOctetGrossErrorVar}_{ij}^2 + \text{OutOctetGrossErrorVar}_{ij}^2 + \text{InUnicastGrossErrorVar}_{ij}^2 + \text{OutUnicastGrossErrorVar}_{ij}^2 \quad \text{DC1}.$$

Input for Small Error Correction

The data required are the same as for the previous corrector. The corrected gross errors for the router interface data become the new traffic input data denoted as previously: for each interface j of router i, InOctets$_{ij}$, OutOctets$_{ij}$: number of octets transported from interface to router and reciprocally and InUcastPkts$_{ij}$, OutUcastPkts$_{ij}$: number of unicast TCP packets transported from interface to router and reciprocally.

The corrected gross errors values, i.e. values of the variables in the gross error corrector (InOctetGrossErrorVar, OutOctetGrossErrorVar, InUnicastGrossErrorVar, OutUnicastGrossErrorVar), are used as input to the small error corrector.

Output of Small Error Corrector

Outputs are corrected small errors of the network data, such that all the constraints are satisfied. For each interface j of router i, InOctetSmallErrorVar$_{ij}$, OutOctetSmallErrorVar$_{ij}$: small error measured in the traffic size InUnicastSmallErrorVar$_{ij}$, OutUnicastSmallErrorVar$_{ij}$: small error measured in number of unicast TCP packets.

Constraints for Small Error Corrector

The general constraints describing the network behaviour are similar to those used for the Gross Error Corrector, i.e. the set of constraints C1 to C9.

Relating Data and Corrected Variables

C11. For each interface j directed to a router i, the corrected traffic is equal to the traffic data (possibly corrected) plus the small error factor.

$$\text{Corrected\_InOctetVar}_{ij} = \text{InOctets}_{ij} + \text{InOctetSmallErrorVar}_{ij} \quad \text{C11.a}$$

$$\text{Corrected\_OutOctetVar}_{ij} = \text{OutOctets}_{ij} + \text{OutOctetSmallErrorVar}_{ij} \quad \text{C11.b}$$

$$\text{Corrected\_InUnicastVar}_{ij} = \text{InUcastPkts}_{ij} + \text{InUnicastSmallErrorVar}_{ij} \quad \text{C11.c}$$

$$\text{Corrected\_OutUnicastVar}_{ij} = \text{OutUcastPkts}_{ij} + \text{OutUnicastSmallErrorVar}_{ij} \quad \text{C11.d}$$

Decision Criteria for Small Error Correction

We minimize the weighted quadratic random errors, which corresponds to the following decision criterion.

$$\min \Sigma\_i\ \Sigma\_j (\text{InOctetSmallErrorVar}_{ij}/\text{InOctets}_{ij})^2 + (\text{OutOctetSmallErrorVar}_{ij}/\text{OutOctets}_{ij})^2 + (\text{InUnicastSmallErrorVar}_{ij}/\text{InUcastPkts}_{ij})^2 + (\text{OutUnicastSmallErrorVar}_{ij}/\text{OutUcastPkts}_{ij})^2 \quad \text{DC2}.$$

After the data have been corrected, the traffic flow is then calculated.

Input of Flow Recogniser

The input data is the set of network and traffic data (corrected).

Output of Flow Recogniser

Outputs are the minimum and maximum sizes of the traffic flow from the external interface k to the external interface l:

OctetVar: volume of traffic in octets

Constraints for Flow Recogniser

All network behaviour constraints C1 to C9.

Decision Criteria for Flow Recogniser

The decision criteria consist of two steps for each route: 1) minimizing the traffic flow on a route from the external interface k to the external interface l and 2) maximizing the traffic flow on this same route:

DC3. min(OctetVar)

DC4. max(OctetVar).

The traffic flow interval for each route is then given the combination of the two solutions [min, max].

In the following, two embodiments of the traffic flow analyser including error correction based on a complete constraint model are now described. In the first embodiment, information about the unicast packets and the TCP traffic is used.

---

Constraint Models of a Traffic Flow Analyser
Input Data for Gross Error Correction ID1. node(Node, Type).
   This fact describes the nodes and their types in the network.
ID2. backbone_line(Router1, Interface1, Router2, Interface2).
   This fact describes the bi-directional backbone connections in the network.
ID3. bandwidth(Router, Interface, Bandwidth, Cost).
   This fact describes the bandwidth and cost for each interface that is active in the network.
ID4. empty_flow(Router1, Interface1, Router2, Interface2).
   This fact describes a zero end-to-end flow from Router1/Interface1 to Router2/Interface2.
ID5. group(Class, Group, Router, Interface).
   This fact describes groups of interfaces.

-continued

Constraint Models of a Traffic Flow Analyser
Input Data for Gross Error Correction

| | |
|---|---|
| ID6. | interface_mib_data(Router, Interface, Time, InOctets, OutOctets, InUcastPkts, OutUcastPkts). This fact represents the traffic data measured for each interface. |
| ID7. | router_mib_data(Router, Time, TcpSegm). This fact represents the traffic data measured for each router, taken from the MIB (Management Information Base). |
| ID8. | router_rmon_data(Router, Time, ShortPktPercentage, LongPktPercentage). This fact represents the traffic data measured for each router, taken from the remote monitoring. |
| ID9. | problem_period(StartTime, EndTime). This fact represents the period for which the data are available. |

The input data has to satisfy the following constraints:

| | |
|---|---|
| IDC1-1. | For each value Node there is at most one fact node/2. |
| IDC1-2. | The type of each node in fact node/2 is 'net' or 'router'. |
| IDC2-1. | Each pair (Node, Interface) occurs at most once in the backbone_line/4 facts. |
| IDC2-2. | There can be no backbone_line/4 fact starting and ending in the same node. |
| IDC2-3. | Each node Node1 of a backbone_line/4 fact must have a node/2 fact. |
| IDC2-4. | Each node Node2 of a backbone_line/4 fact must have a node/2 fact. |
| IDC2-5. | The interface Interface1 of a backbone_line/4 fact cannot be 'local'. |
| IDC2-6. | The interface Interface2 of a backbone_line/4 fact cannot be 'local'. |
| IDC2-7. | Each pair (Node1, Interface1) of a backbone_line/4 fact must have a bandwidth/4 fact. |
| IDC2-8. | Each pair (Node2, Interface2) of a backbone_line/4 fact must have a bandwidth/4 fact. |
| IDC2-9. | There can be no backbone line between two net nodes. |
| IDC3-1. | For each pair (Node, Interface) of a bandwidth/4 fact there is only one entry. |
| IDC3-2. | If the interface name is 'local', the bandwidth of a backbone_line/4 fact must be maximal. |
| IDC3-2. | Each node Node of a bandwidth/4 fact must have a node/2 fact. |
| IDC3-3. | An entry for a net node whose interface does not occur in a backbone_line/4 fact must have interface 'local' of a bandwidth/4 fact. |
| IDC3-4. | If the interface name is 'local' of a bandwidth/4 fact, then the node must be a net node. |
| IDC4-1. | (Router1, Interface1) of a empty_flow/4 fact must be an external router interface. |
| IDC4-2. | (Router2, Interface2) of a empty_flow/4 fact must be an external router interface. |
| IDC4-3. | There is an implicit empty_flow(R,I,R,I) for all external router interfaces (R,I), which is not represented by a fact. |
| IDC4-4. | Interface1 of a empty_flow/4 fact can not be 'local'. |
| IDC4-5. | Interface2 of a empty_flow/4 fact can not be 'local'. |
| IDC4-6. | Each pair (Router1, Interface1) of a empty_flow/4 fact must have a fact line_to_other_as/3. |
| IDC4-7. | Each pair (Router2, Interface2) of a empty_flow/4 fact must have a fact line_to_other_as/3. |
| IDC5-1. | The pair (Router, Interface) of a group/4 fact is an external router interface. |
| IDC5-2. | Groups of 'pops' class must contain all interfaces of their routers. |
| IDC5-3. | One pair (Router, Interface) of a group/4 fact can belong to only one group of some class. |
| IDC6-1. | There is only one interface_mib_data/7 fact for each triple (Router, Interface, Time). |
| IDC6-2. | There must be a bandwidth fact for each pair (Router, Interface) of a interface_mib_data/7 fact. |
| IDC7-1. | There is at most one router_mib_data/3 fact for each pair (Router, Time). |
| IDC8-1. | There is at most one router_mib_data/3 fact for each pair (Router, Time). |

Variables
Router related variables: [In/Out][Long/Mid/Short][Tcp]Var
Interface related variables: [In/Out][LongPkt/MidPkt/ShortPkt/TcpPkt]Var
Flow variables: OctetVar
Error variables: [In/Out][Octet/Unicast][Gross/Small]ErrorVar Constraints
All network behaviour constraints C1 to C10.

Output
Outputs are gross error corrections: [In/Out][Octet/Unicast]GrossErrorVar.

Decision Criteria
Decision criterion DC1.

Input Data for Small Error Correction
All input data ID1 to ID9 that satisfy constraints IDC1-IDC8.

Variables
Router related variables: [In/Out][Long/Mid/Short][Tcp]Var
Interface related variables: [In/Out][LongPkt/MidPkt/ShortPkt/TcpPkt]Var
Flow variables: OctetVar
Error variables: [In/Out][Octet/Unicast]SmallErrorVar Constraints
All network behaviour constraints C1-C9, C11.

Output
Outputs are small error corrections: [In/Out][Octet/Unicast]SmallErrorVar.

Decision Criteria
Decision criterion DC2.

Input Data for Flow Recogniser
All input data ID1 to ID9 that satisfy constraints IDC1-IDC8.

Variables
Router related variables: [In/Out][Long/Mid/Short][Tcp]Var
Interface related variables: [In/Out][LongPkt/MidPkt/ShortPkt/TcpPkt]Var
Flow from external interface k to external interface l: OctetVar Constraints
All network behaviour constraints C1 to C9.

Output
Output is the minimum and maximum sizes Min and Max of the traffic flows between any two groups Group1 and Group2 of external nodes:
OD1. flow_between(pop, pop, Corrections, Flows).
OD2. flow_between(pop, interconnection, Corrections, Flows).
OD3. flow_between(tariff class, interconnection, Corrections, Flows).
OD4. flow_vpn(Corrections, Flows).
where Flows is a list of terms of the form flow(Group1, Group2, Min, Max).

Decision Criteria
Decision criteria DC3 and DC4.

A second embodiment of the traffic flow analyser including error correction based on a complete constraint model will now be described. In this embodiment information about the non-unicast packets and the UDP traffic is used in addition to information about the unicast packets and the TCP traffic. Accordingly, also the constraints of this model are different from the constraints of the first embodiment.

Input Data for Gross Error Correction

All input data ID1-ID5, ID9. The following traffic data are different to ID6 to ID8:

| | |
|---|---|
| ID6*. | interface_mib_data(Router, Interface, Time, InOctets, OutOctets, OutUcastPkts, OutUcastPkts, InNUcastPkts, OutNUcastPkts, ErrorIn, ErrorOut, DiscardIn, DiscardOut). |
| ID7*. | router_mib_data(Router, Time, TcpSegm, UdpDat). |
| ID8*. | router_rmon_data(Router, Time, TcpPercentage, UdpPercentage, ShortPktPercentage, LongPktPercentage). |
| The input data has to satisfy constraints IDC1–IDC5 and | |
| IDC6-1*. | There is only one interface_mib_data/14 fact for each triple (Router, Interface, Time). |
| IDC6-2*. | There must be a bandwidth/4 fact for each pair (Router, Interface) of a interface_mib_data/14 fact. |
| IDC7-1*. | There is at most one router_mib_data/4 fact for each pair (Router, Time). |
| IDC8-1*. | There is at most one router_mib_data/4 fact for each pair (Router, Time). |

Variables

Router related variables:

[In/Out][Long/Mid/Short][Tcp/Udp]Var

Constraints for each router:

| | |
|---|---|
| C20-a* | Sum_j InUcastPktVar_j = Sum_j OutUcastPktVar_j |
| C20-b* | Sum_j InNonUcastPktVar_j =< Sum_j OutNonUcastPktVar_j |
| C20-c* | Sum_j InTcpPktVar_j =< Sum_j OutTcpPktVar_j |
| C20_d* | Sum_j OutUdpPktVar_j =< Sum_j OutUdpPktVar_j |
| C21a* | Sum_j InTcpPktVar_j = TcpPercentage * Sum_j(InTcpPktVar_j + InUdpPktVar_j) |
| C21b* | Sum_j InUdpPktVar_j = UdpPercentage * Sum_j(InTcpPktVar_j + InUdpPktVar_j) |
| C22a* | Sum_j InLongPktVar_j = LongPercentage * Sum_j(InTcpPktVar_j + InUdpPktVar_j) |
| C22b* | Sum_j InShortPktVar_j = ShortPercentage * Sum_j(InTcpPktVar_j + InUdpPktVar_j) |
| C23a* | TcpSegm =< Sum_j InTcpPktVar_j |
| C23b* | Sum_j InTcpPktVar_j =< MaxNumber * TcpSegm |
| C24a* | UdpDat =< Sum_j InUdpPktVar_j |
| C24b* | Sum_j InUdpPktVar_j =< MaxNumber * UdpDat |

Interface related variables:
[In/Out][Unicast/NonUnicast/Long/Mid/Short][TcpPkt/UdpPkt]Var
Flow variables: OctetVar
Error variables:
[In/Out][Octet/Unicast/NonUnicast][Gross/Small]ErrorVar Constraints
All network behaviour constraints C8-a, C9, C10 and
Constraints for each interface j of router i:

| | |
|---|---|
| C12-a* | InTcpPktVar = InLongTcpPktVar + InMidTcpPktVar + InShortTcpPktVar |
| C12-b* | InUdpPktVar = InLongUdpPktVar + InMidUdpPktVar + InShortUdpPktVar |
| C12-c* | OutTcpPktVar = OutLongTcpPktVar + OutMidTcpPktVar + OutShortTcpPktVar |
| C12-d* | OutUdpPktVar = OutLongUdpPktVar + OutMidUdpPktVar + OutShortUdpPktVar |
| C13-a* | InTcpPktVar =< OutTcpPktVar |
| C13-b* | InLongTcpPktVar =< OutShortTcpPktVar |
| C13-c* | OutLongTcpPktVar =< InShortTcpPktVar |
| C14-a* | InLongPktVar = InLongTcpPktVar + InLongUdpPktVar |
| C14-b* | OutLongPktVar = OutLongTcpPktVar + OutLongUdpPktVar |
| C15-a* | InShortPktVar >= InShortPktTcp |
| C15-b* | OutShortPktVar >= OutShortPktTcp |
| C16-a* | InMidPktVar >= InMidTcpPktVar + InMidUdpPktVar |
| C16-b* | OutMidPktVar >= OutMidTcpPktVar + OutMidUdpPktVar |
| C17-a* | InTcpPktVar + InUdpPktVar = InUcastPktVar + InNonUcastPktVar |
| C17-b* | OutTcpPktVar + OutUdpPktVar = OutUcastPktVar + OutNonUcastPktVar |
| C18-a* | InOctetVar =< 64*InShortTcpPktVar + MaxPktSize*(InMidTcpPktVar + InMidUdpPktVar) + 576*(InLongTcpPktVar + InLongUdpPktVar) |
| C18-b* | InOctetVar >= 64*InShortTcpPktVar + MinPktSize*(InMidTcpPktVar + InMidUdpPktVar) + 576*(InLongTcpPktVar + InLongUdpPktVar) |
| C18-c* | OutOctetVar =< 64*OutShortTcpPktVar + MaxPktSize*(OutMidTcpPktVar + OutMidUdpPktVar) + 576*(OutLongTcpPktVar + OutLongUdpPktVar) |
| C18-d* | OutOctetVar >= 64*OutShortTcpPktVar + MinPktSize*(OutMidTcpPktVar + OutMidUdpPktVar) + 576*(OutLongTcpPktVar + OutLongUdpPktVar) |

Constraints for each line:

| | |
|---|---|
| C19* | InXPktVar_a = OutXPktVar_b for X is LongTcp, LongUdp, ShortTcp, ShortUdp, MidTcp, MidUdp, Ucast, NonUcast where interfaces a and b define a line. |

Output
Outputs is gross error corrections:
[In/Out][Octet/Unicast/NonUnicast]GrossErrorVar.

Decision Criteria
DC1*. The decision criterion is $$\min \Sigma\_i \ \Sigma\_j \text{InOctetGrossErrorVar}_{ij}^2 + \text{OutOctetGrossErrorVar}_{ij}^2 + \text{InUnicastGrossErrorVar}_{ij}^2 + \text{OutUnicastGrossErrorVar}_{ij}^2 + \text{InNonUnicastGrossErrorVar}_{ij}^2 + \text{OutNonUnicastGrossErrorVar}_{ij}^2$$

Input for Small Error Correction
All input data ID1-ID5, ID6*-ID8*, ID9 that satisfy constraints IDC1-IDC5, IDC6*-IDC8*.

Variables
Router related variables:
    [In/Out][Long/Mid/Short][Tcp/Udp]Var
Interface related variables:
    [In/Out][Unicast/NonUnicast/Long/Mid/Short][TcpPkt/UdpPkt]Var
Flow variables: OctetVar
Error variables:
    [In/Out][Octet/UnicastlNonUnicast]SmallErrorVar Constraints All network behaviour constraints C8-a, C9, C11 and C12* to C24*.

Output

Output is small error corrections:
[In/Out][Octet/Unicast/NonUnicast]SmallErrorVar.

Decision Criteria

DC2*. The decision criterion is $$\min \Sigma\_i \Sigma\_j (\text{InOctetSmallErrorVar}_{ij}/\text{OctetIn}_{ij})^2 + \\ (\text{OutOctetSmallErrorVar}_{ij}/\text{OctetOut}_{ij})^2 + (\text{InUnicastSmallErrorVar}_{ij}/\text{UnicastPacketIn}_{ij})^2 + (\text{OutUnicastSmallErrorVar}_{ij}/\text{UnicastPacketOut}_{ij})^2 + \\ (\text{InNonUnicastSmallErrorVar}_{ij}/\\ \text{NonUnicastPacketIn}_{ij})^2 + \\ (\text{OutNonUnicastSmallErrorVar}_{ij}/\\ \text{NonUnicastPacketOut}_{ij})^2$$

Input Data for Flow Recogniser

All input data ID1-ID5, ID6*-ID8*, ID9 that satisfy constraints IDC1-IDC5, IDC6*-IDC8*.

Variables

Router related variables:
[In/Out][Long/Mid/Short][Tcp/Udp]Var

Interface related variables:
[In/Out][Unicast/NonUnicast/Long/Mid/Short][TcpPkt/UdpPkt]Var Flow from external interface k to external interface l:
OctetVar Constraints All network behaviour constraints C8-a, C9, and C12* to C24*.

Output

All output is OD1-OD4.

Decision Criteria

The decision criteria are DC3 and DC4.

In the embodiments described herein a routing algorithm is used which is based on the OSPF protocol. However the OSPF routing-algorithm has been changed, as will be explained in the following:

The OSPF (Open Shortest Path First) protocol uses a link-state algorithm in order to build and calculate all shortest paths within a network. The algorithm by itself is quite complicated. The following is a very high level, simplified way of looking at the various steps of the algorithm:

1. Upon initialisation or due to any change in routing information, a router generates a link-state advertisement. This advertisement represents the collection of all link-states on the router.
2. All routers exchange link-state advertisements. Each router that receives a link-state update stores a copy in its database and then propagate the update to other routers.
3. After the database of each router is completed, the router calculates the shortest paths to all destinations, using Dijkstra's algorithm. The destinations, the associated routing costs and the next hops to reach those destinations are stored in the routing table.
4. Changes that occur in the network (e.g. network resources have been upgraded, added or deleted), are communicated via link-state packets, and Dijkstra's algorithm is recalculated to find the shortest paths.

Note that the goal of the two first steps in the OSPF algorithm is basically to exchange connectivity information between nodes and inspect component failure prior to routes computation. If a link has gone down, the OSPF algorithm deletes connections to that link and finds alternative routes if they exist. This link-state characteristic makes the OSPF protocol highly dynamic.

The implementation of the OSPF routing algorithm adapted in the embodiments described above, as opposite to the real one, is not dynamic. Instead, the traffic flow optimisation system models the network topology and generates optimal routes without taking the reliability issue of network components into consideration. The system computes routes through the network and considers these routes as static routes until the network topology is not changed. If nodes, lines or the bandwidth of the lines is changed, then the system calculates optimal routes again. Since network data are collected over relatively small time intervals (e.g. 5 minutes), the probability of component failure within this interval is expected to be small. Even if failure occurs, the system will recognise this in the next updated network data and correct the optimal routes. Consequently, the solutions provided by the traffic flow optimisation system are most likely to be very realistic and satisfactory.

The OSPF routing algorithm computes optimal routes from the network topology and the routing cost of each directed line. An optimal route from node A to node B is the lowest-cost path from A to B. The path cost is the sum of the routing costs of all links on that path. The routing cost of a link is inversely proportional to the bandwidth of that link. If more than one lowest-cost path between the two nodes are found, all of these paths are considered as optimal routes.

Input Data for adapted Implementation of the OSPF Routing Algorithm

All input data ID1 to ID3 that satisfy constraints IDC1-IDC3.

Variables

A list of successors, denoted by ListOfSuccessors, of node N on all optimal paths to destination node D.

Constraints

The Dijkstra's algorithm.

Output

OD5. hop(Source, Destination, ListOfSuccessors).

Decision Criteria

The hops define all optimal routes between any two nodes of the network.

Whilst in the above described embodiments quadratic objection functions are described, it is appreciated that alternatively non-quadratic objective functions can be used.

Whilst in the above described embodiments, IP networks are described, it is appreciated that the invention may be implemented into other types of communication networks.

Whilst in the above described embodiments the traffic flow measurements are obtained using the SNMP, it is appreciated that alternatively other network management protocols can be used.

Whilst in the above described embodiments a specific set of traffic flow measurement obtained from the router and router interfaces are described, it is appreciated that other measurements can be used instead or in addition to the measurements described.

It is to be understood that the embodiments described above are preferred embodiments only. Namely, various features may be omitted, modified or substituted by equivalents without departing from the scope of the present invention, which is defined in the accompanying claims.

The invention claimed is:

1. A method of calculating data flow in a communications network, the communications network comprising a plurality of nodes including a plurality of source nodes, a plurality of internal nodes, and a plurality of destination nodes, the nodes being connected to one another by links, the method comprising:
   (a) obtaining data traffic flow measurements through said nodes and links as input data;
   (b) correcting said input data if inconsistencies are detected;
   (c) calculating upper and lower bounds of data traffic flow from a selected one of the plurality of source nodes to a selected one of the plurality of destination nodes using the corrected input data;
      wherein calculating upper and lower bounds of data traffic flow using the corrected input data comprises calculating for each link between the selected source node and the selected destination node what proportion of data traffic flow originates at the selected source node and terminates at the selected destination node; and
      wherein the selected source node and the selected destination node are interconnected via at least one of the internal nodes, the internal node connected to at least one other node by a link.

2. The method of claim 1, further comprising repeating step (c) for each of the plurality of source and destination nodes.

3. The method of claim 1, comprising repeating step (a) in periodic intervals.

4. The method of claim 1, wherein the measurements represent the rate of data traffic flow.

5. A method of calculating source-destination traffic in a data communications network, the network comprising a plurality of nodes including a plurality of source nodes, a plurality of internal nodes, and a plurality of destination nodes, the nodes being interconnected by links, and a plurality of routes each comprising one or more links and originating at a source node and terminating at a destination node, the method comprising:
   (a) obtaining measurements of the rate of data traffic input into and output from nodes and links;
   (b) determining the relations between the data traffic rates through said routes to describe the network behaviour;
   (c) calculating for each of the links of a selected route what proportion of the data traffic rate originates at the source node and terminates at the destination node of said selected route; and
   (d) calculating a minimum and maximum data traffic rate through said selected route;
      wherein the source node and the destination node are interconnected via at least one of the internal nodes, the internal node connected to at least one other node by a link.

6. The method of claim 5, further comprising repeating steps (c) and (d) for each of said plurality of routes.

7. The method of claim 5, wherein said relations in step (b) include relations among data traffic rates based on the definition of network protocol (such as IP, TCP, UDP) which defines the network behaviour.

8. The method of claim 5, further comprising computing the plurality of routes in accordance with a predetermined routing protocol (such as OSPF, ISIS or EIGRP).

9. The method of claim 5, wherein step (d) further comprises:
   verifying the consistency of the data rate measurements using information about the network topology and the determined network behaviour; and
   correcting measurement errors if inconsistencies are determined.

10. The method of claim 9, further comprising solving a linear programming problem with a quadratic objective function to minimize the data traffic reconciliation (error correction).

11. The method of claim 9, further comprising solving a linear programming problem with a non-quadratic objective function to minimise the data traffic reconciliation (error correction).

12. The method of claim 10 or 11, wherein the step of solving a linear programming problem comprises a first substep of correcting large mismatches, and a second substep of correcting small mismatches.

13. The method of claim 5, further comprising:
   selecting a first and a second set of nodes;
   solving a first linear programming problem by computing the minimum rate of data traffic from the first to the second set of nodes; and
   solving a second linear programming problem by computing the maximum rate of data traffic from the first to the second set of nodes.

14. A method of calculating data traffic in a communications network, the network comprising a plurality of nodes interconnected by links, and a plurality of routes each comprising a number of said links and interconnecting a source node with a destination node, the method comprising:
   (a) obtaining data traffic flow measurements as input data;
   (b) determining a plurality of constraints describing the topology and/or behaviour of the network;
   (c) testing the consistency of said input data; and
   (d) calculating an upper and lower bound of data traffic along one or more of said routes using said input data and the constraints determined in step (b);
      wherein calculating an upper and lower bound of data traffic comprises calculating for each of the links of a selected route what proportion of the data traffic originates at the source node and terminates at the destination node of said selected route; and
      wherein the source node and the destination node are interconnected via at least one internal node, the internal node connected to at least one other node by a link.

15. The method of claim 14, wherein step (a) further comprises measuring the number of units of different types of data transmitted through each of said links in both directions.

16. A method according to claim 14, wherein measurements of the data traffic are obtained from network nodes and node-link interfaces to said nodes.

17. A method according to claim 14, wherein said constraints comprising any of the following constraints:
   routing-based constraints
   link-based constraints
   node-based constraints
   error-based constraints.

18. The method of claim 14, wherein said constraints relate to any of the following:
   the size of data packets used in the network;
   relationship between the number of data packets and the data traffic volume;

constraints determined by the routing protocol used in the network;

the relationship between incoming and outgoing data traffic at said plurality of nodes;

the relationship between the data traffic at both ends of each link;

the relationship between the data traffic along said routes and the data traffic input into and output from the network.

19. The method of claim 14, further comprising using inference rules to determine said upper and lower bounds of data traffic flow.

20. The method of claim 19, further comprising performing a correction process to take account of inconsistencies between said measurements and the inference rules.

21. The method of claim 20, wherein the correction process comprises a first process for correcting gross errors, and a second process for correcting small errors.

22. The method according to claim 20, wherein corrected input data resulting from said correction process are used in step (d) for calculating said upper and lower bounds of data traffic.

23. An apparatus for calculating data traffic flow in a communications network, the communications network comprising a plurality of nodes including a plurality of source nodes, a plurality of internal nodes, and a plurality of destination nodes, the nodes being connected to one another by links, the apparatus comprising:

means for obtaining measurements of the data traffic flow through nodes and links;

means for correcting said measurements and calculating upper and lower bounds of the data traffic flow originating at a selected one, of the plurality of source nodes and terminating at a selected one of the plurality of destination nodes, wherein means for calculating upper and lower bounds of the data traffic flow comprises calculating for each link between the selected source node and the selected destination node what proportion of data traffic flow originates at the selected source node and terminates at the selected destination node; and wherein the selected source node and the selected destination node are interconnected via at least one of the internal nodes, the internal node connected to at least one other node by a link.

24. An apparatus for calculating source-destination traffic in a data communications network, the network comprising a plurality of nodes including a plurality of source nodes, a plurality of internal nodes, and a plurality of destination nodes, the nodes being interconnected by links, and a plurality of routes each comprising one or more links and originating at a source node and terminating at a destination node, the apparatus comprising:

means for obtaining measurements of the rate of data traffic input into and output from nodes and links;

means for determining the relations between the data traffic rates through said routes to describe the network behaviour;

means for calculating for each of the links of a selected route what proportion of the data traffic rate originates at the source node and terminates at the destination node of said selected route, and a minimum and a maximum data traffic rate through said selected route;

wherein the source node and the destination node are interconnected via at least one of the internal nodes, the internal node connected to at least one other node by a link.

25. The apparatus of claim 24, further comprising a store for storing the measured data traffic rates.

26. The apparatus of claim 24, wherein said measurements are obtained periodically.

27. The apparatus of claim 24, further comprising means for measuring the data traffic input into and output from nodes and links over a predetermined period of time to determine the rate of data traffic.

28. The network management system of claim 27, wherein said predetermined time period is at least twice as large as the period for obtaining said measurements.

29. A computer-readable medium storing computer-executable instructions for calculating source-destination traffic in a data communications network, the data communications network comprising a plurality of nodes including a plurality of source nodes, a plurality of internal nodes, and a plurality of destination nodes, the nodes being interconnected by links, and a plurality of routes each comprising one or more links and originating at a source node and terminating at a destination node, said instructions comprising:

code for obtaining measurements of the rate of data traffic input into and output from nodes and links;

code for determining the relations between the data traffic rates through said routes to describe the network behaviour;

code for calculating for each of the links of a selected route what proportion of the data traffic rate originates at the source node and terminates at the destination node of said selected route; and code for calculating a minimum and maximum data traffic rate through said selected route;

wherein the source node and the destination node are interconnected via at least one of the internal nodes, the internal node connected to at least one other node by a link.

30. The computer-readable medium of claim 29 further comprising code for computing the plurality of routes in accordance with a predetermined routing protocol.

* * * * *